United States Patent [19]

Schuld

[11] Patent Number: 5,764,472
[45] Date of Patent: Jun. 9, 1998

[54] ISOLATOR ASSEMBLY

[75] Inventor: Heinrich Ludwig Schuld, Pretoria, South Africa

[73] Assignee: African Electrical Technologies CC, Pretoria, South Africa

[21] Appl. No.: 441,228

[22] Filed: May 15, 1995

[30] Foreign Application Priority Data

May 24, 1994 [ZA] South Africa ............... 94/3609

[51] Int. Cl.$^6$ .................................. H02B 5/00
[52] U.S. Cl. .................................. 361/602; 361/603
[58] Field of Search ............... 200/48 R, 48 P, 200/48 KB, 48 V, 485 B; 361/601–611

[56] References Cited

U.S. PATENT DOCUMENTS

| | | | |
|---|---|---|---|
| 1,843,286 | 2/1932 | Jansson | 361/602 |
| 3,052,786 | 9/1962 | Bertling | 200/48 SB |
| 4,713,500 | 12/1987 | Osborne | 200/48 KB |
| 4,752,859 | 6/1988 | Chabala et al. | 361/602 |
| 4,866,569 | 9/1989 | Okumara et al. | 361/601 |
| 5,293,012 | 3/1994 | Levi | 200/48 P |

FOREIGN PATENT DOCUMENTS 0055094  6/1982  European Pat. Off. ........... 361/603

*Primary Examiner*—Gregory D. Thompson
*Attorney, Agent, or Firm*—Ladas & Parry

[57] ABSTRACT

An isolator assembly (20) is provided for selectively isolating or connecting first and second bus bars (31) located on opposed sides of a wall (22). The assembly includes mounting means (24), for mounting the assembly (20) in the wall (22), and a through-wall conductor. The through-wall conductor (28) is supported by the mounting means (24) and has a contactor (30) capable of selectively making electrical contact with at least one of the bus bars (31). The conductor (28) is displaceable between a connecting position in which the conductor (28) connects the first and the second bus bars (31) and a disconnecting position in which the first and the second bus bars (31) are isolated from each other.

18 Claims, 9 Drawing Sheets

ISOLATOR ASSEMBLY

This invention relates to an isolator assembly particularly, but not necessarily exclusively, intended for use in high voltage, e.g. from about 44 kV to about 275 kV, sub stations. It relates also to a contactor assembly for the isolator assembly, and a substation installation including the isolator assembly and optionally the integration of various conventional discrete substation components.

In such sub stations, the modern tendency is to enclose the sub station in a building rather than erecting it in the open air. In the building, it would be desirable to locate different parts of the sub station in enclosed separate building cells separated by a wall so that if a fault occurs in one cell, the enclosure limits the effect of any blast occurring as a result of the fault. For the purposes of this specification, the term "wall" is intended to include partitions of any sort e.g. walls, floor slabs or the like.

According to the invention there is provided an isolator assembly for selectively isolating or connecting first and second bus bars located on opposed sides of a wall, the assembly including mounting means for mounting the assembly in the wall; and a through-wall conductor supported by the mounting means and having a contactor capable of selectively making electrical contact with at least one of the bus bars, the conductor being displaceable between a connecting position in which the conductor connects the first and the second bus bars and a disconnecting position in which the first and the second bus bars are isolated from each other.

The mounting means may include a frame locatable in the wall, and a hub pivotally mounted within the frame. The through-wall conductor may be in the form of a bushing fixed to the hub to be pivotable with the hub between the connecting and disconnecting positions, the contactor being attached to the bushing at an end of the bushing which is remote from its attachment to the hub.

The bushing may have a pair of bushing arms thereon extending in opposite directions from the hub, each bushing arm having at its end remote from its attachment to the hub a contactor capable of making electrical contact with the respective first and second bus bars. The bushing may then be fixed to the hub intermediate its ends, e.g. centrally along a longitudinal axis of the bushing.

The bushing may be pivotable through an arc spanning an acute angle, typically about eighty degrees, from its connecting position with the bushing extending substantially at right angles relative to the wall, to its disconnecting position with the bushing extending close to a face of the wall. The assembly may include a drive mechanism for pivoting the bushing between its connecting and disconnecting positions, the drive mechanism including a drive arm having adjustment means for adjusting its effective length thereby to permit variation of a length of the arc through which the bushing can be pivoted.

The arm may be connected to a train of three crank arms. The drive arm may be reciprocable by suitable drive means, e.g. a motor, gear train, or the like. The drive means may be located, in use, in a cell remote from the isolator assembly. When a plurality of isolator assemblies are mounted in a wall, e.g. one for each of a three phase system, a common drive means may be provided for all the isolator assemblies.

The hub may be pivotally mounted within the frame via at least one pair of bearings, e.g. a sleeve bearing. The hub may have a step down current transformer mounted therein, the transformer being capable of developing an output signal proportional to current flowing in the through-wall conductor.

The frame may include an outer frame configured to be built into the wall, and an inner frame removably mountable within the outer frame. The outer frame may have a plurality of outwardly projecting anchoring formations thereon to assist in anchoring the frame within the wall. Each anchoring formation may be in the form of a flat bar having at its end remote from the outer frame a splayed end further to assist in anchoring the bar in the wall.

The frame may be in the form of a box frame having a depth substantially equal to a thickness of the wall in which the frame is to be mounted. The outer frame may then be built into the wall during erection of the wall without the inner frame, hub and bushing, thereby to avoid damage to the hub and the bushing during building operations.

The isolator assembly may include a flash barrier which is flexible and which covers respective windows defined between the hub and opposite sides of the frame while the through-wall conductor is in its connecting position. Typically, the flash barrier is in the form of a woven glass mat. The flash barrier may also include steel plates.

The isolator assembly may include at least one insulator member, typically a pair of insulator members, each insulator member having a base plate for mounting it relative to the wall, e.g. on the frame, and having a complemental contactor at its end remote from the base plate for making electrical contact with the contactor on the through-wall conductor. The base plate may include adjustment means for adjusting the position of the insulator member relative to the base plate.

The insulator member may have connection means at its end remote from the base plate for connecting the bus bar thereto. The connection means may include a plate assembly having a clamp for receiving the bus bar, the plate assembly having the complemental contactor thereon. The plate assembly may have adjustment means for adjustably attaching it to the insulator member.

The insulator member may for example be solid core porcelain or instead define a housing for housing a voltage transformer or surge arrestor. The housing may be in the form of a composite fibre gas insulated tube. Typically, the housing may contain an inert gas and be covered by a hydrophobic outer layer.

The assembly may include an earthing mechanism for earthing the bus bar while power is removed from the bus bar. The earthing mechanism may include an earthed rod or blade pivotally fixed relative to the wall, e.g. on the frame, the earthed rod being displaceable between an inoperative position remote from the bus bar, and an operative position connecting the bus bar to earth. The rod may be displaceable by a suitable drive mechanism.

The invention extends to a contact assembly for an isolator assembly hereinbefore described, the contact assembly including at least two jaw members for receiving a male complemental contactor of the isolator assembly therebetween, the jaw members being mounted on a support member which is pivotally mounted, and the support member being biassed by a biassing member to lock in two extreme positions, namely a receiving position for receiving the male complemental contactor between the jaw members, and a locking position with the male complemental contactor fully home between the jaw members, the male complemental contactor being capable of pivoting the jaw members with a camming action between their receiving and locking positions as the male complemental contactor enters the jaw members.

The jaw members may each be in the form of a U shaped bar, one limb of the U shaped bar being fixed to the support member and another limb of the U shaped bar providing a camming surface for co-operating with the male complemental contactor.

The U shaped bar may be resilient and the limbs biassed outwardly away from one another by a biassing spring located intermediate the limbs. The biassing spring may be insulated from one limb to prevent current flowing through it.

A stop formation may be provided for limiting the degree of pivotal movement of the support member in at least one direction. The male connector element may have an arcuate, e.g. elliptical, operative camming face thereon.

The invention extends also to a substation installation including at least two separate cells separated by a common wall, the installation including at least one isolator assembly as described above for selectively electrically interconnecting bus bars in the cells.

An embodiment of the invention is now described by way of example with reference to the accompanying drawings, in which FIG. 1 shows a schematic sectional end view of an isolator assembly in accordance with the invention, in its connecting position;

Figure 1:
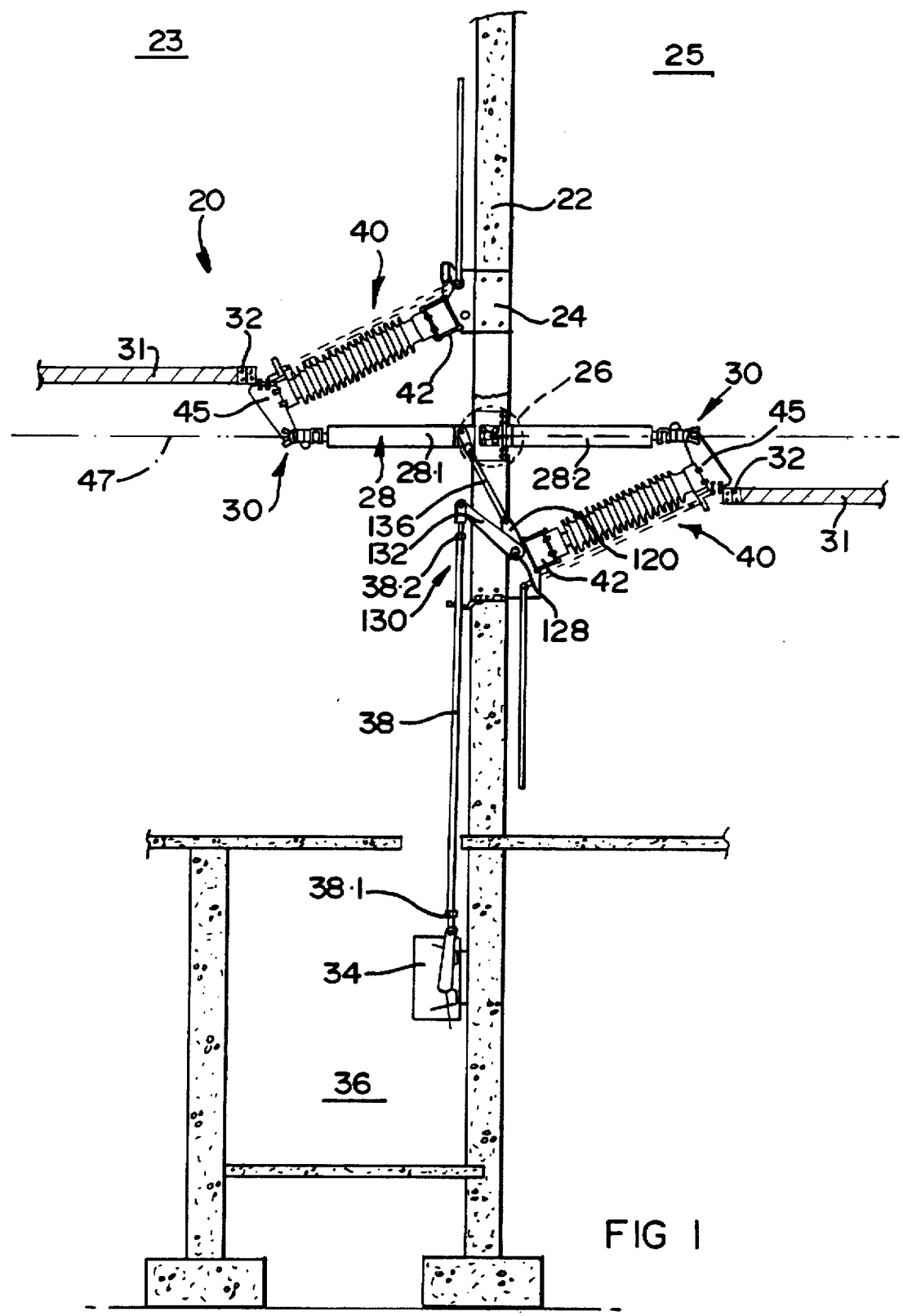
Figures 2, 3:
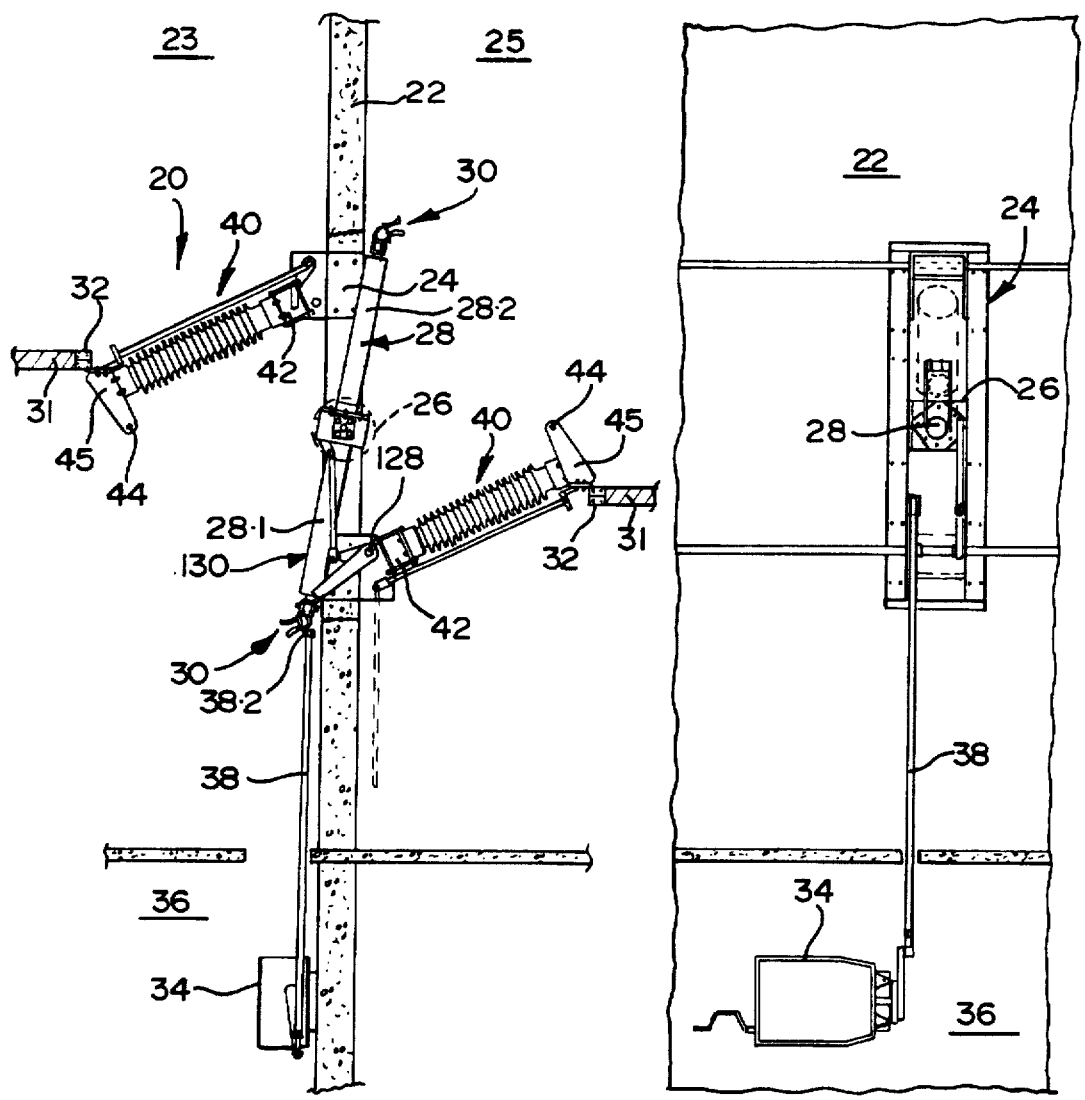
FIG. 2 shows a view similar to FIG. 1 of the assembly in its disconnecting position.
FIG. 3 shows a side view of the assembly of FIG. 1.

Referring to FIGS. 1 to 3, reference numeral 20 generally indicates an isolator assembly intended for use in a high voltage sub station. In such a sub station, different portions of the apparatus used in the sub station are enclosed in separate building cells 23, 25 separated by a wall 22. In order selectively to interconnect or break electrical contact between different cells on either side of the wall 22, three isolator assemblies, one for each phase of a three phase supply, are mounted within the wall 22. Only one of the isolator assemblies is shown in the drawings. The assembly 20 includes mounting means comprising a frame 24 and a hub 26 centrally pivotally mounted within the frame 24. A through-wall conductor in the form of a bushing 28 is fixed to the hub 26 and is pivotable together with the hub 26 between a connecting position shown in FIG. 1 with the bushing 28 extending at right angles to the wall 22 and a disconnecting position shown in FIG. 2 with the bushing 28 lying almost parallel to the wall 22.

The bushing 28 has a pair of bushing arms 28.1, 28.2 and, at each free end of the bushing 28, a contactor 30 is provided allowing electrical contact to be made with bus bars 31 (only shown in FIGS. 1 and 2) which are connected to clamps 32.

Pivoting of the bushing 28 is accomplished by a drive motor 34 located in a cell 36, e.g. in a cellar beneath the sub station building. The drive motor 34 reciprocates a rod 38 which in turn causes the pivoting movement via a series of crank arms 130 as described in more detail below. The single drive motor 34 also pivots the bushings 28 of the isolator assemblies of the other two phases via a common drive shaft 128.

The bus bars 31 which are connected to the clamps 32 are supported on an insulator member 40 fixed at one end via a base plate 42 to the frame 24. The base plate 42 includes adjustment means (not shown) whereby the angle at which the insulator member 40 extends from the wall can be accurately adjusted thereby to ensure that the contactors 30 on the bushing 28 accurately align with a complemental male contactor 44 (see FIG. 2) on the insulator member 40. The contactor 44 is mounted on a plate assembly 45 which is also adjustably mounted relative to the insulator member 40.

Figure 4:
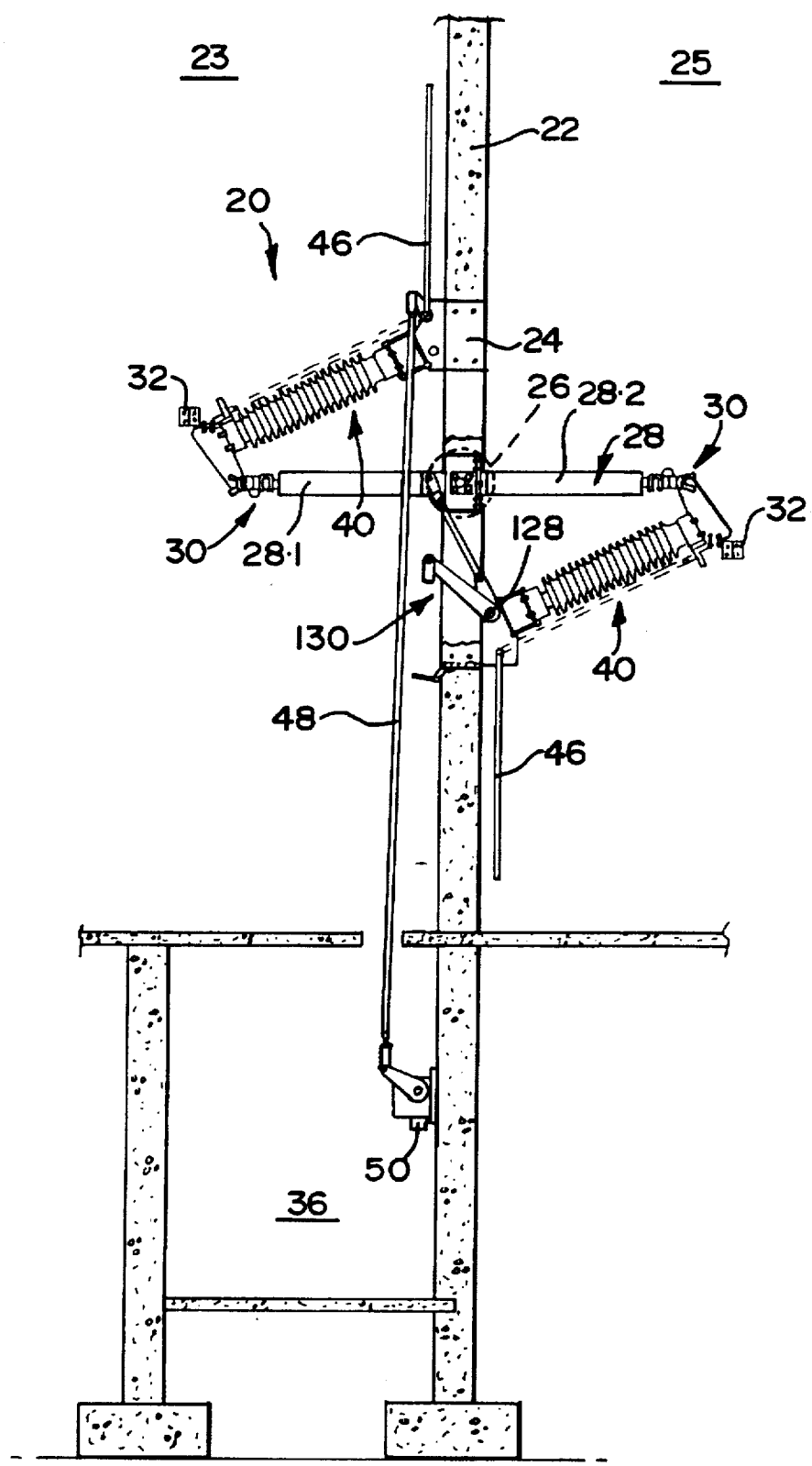
FIG. 4 shows a schematic sectional end view of the assembly of FIG. 1 illustrating the earthing mechanism of the assembly.
Figure 5:
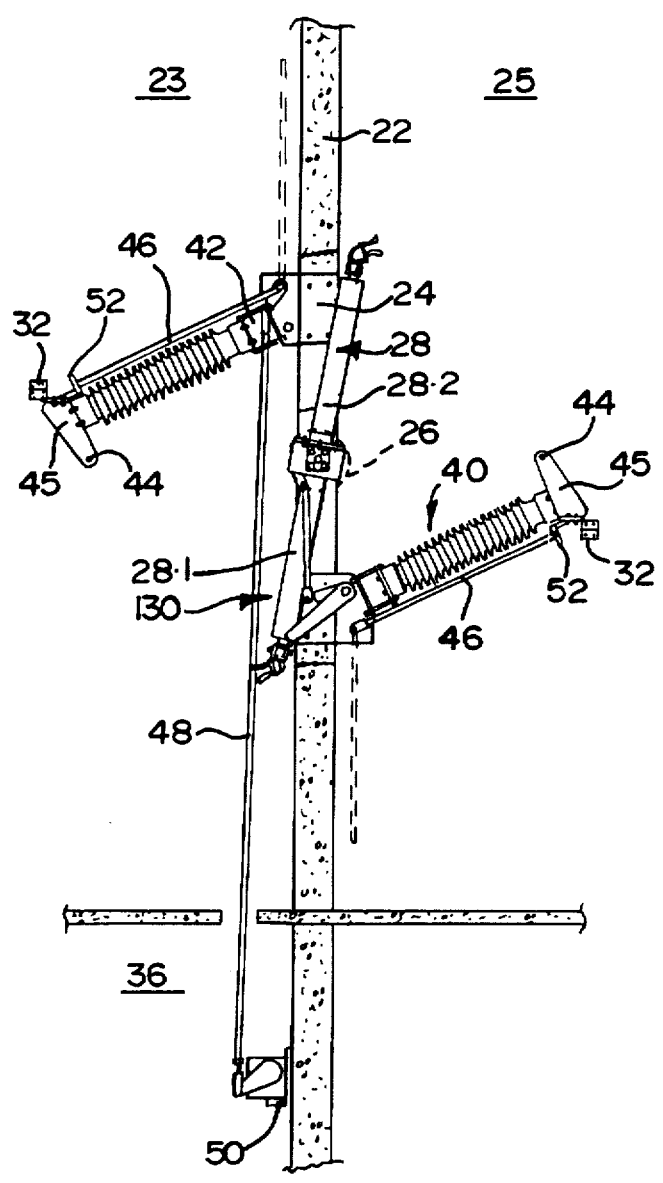
FIG. 5 shows a sectional end view of the assembly of FIG. 4 in its disconnecting position.
Figure 6:
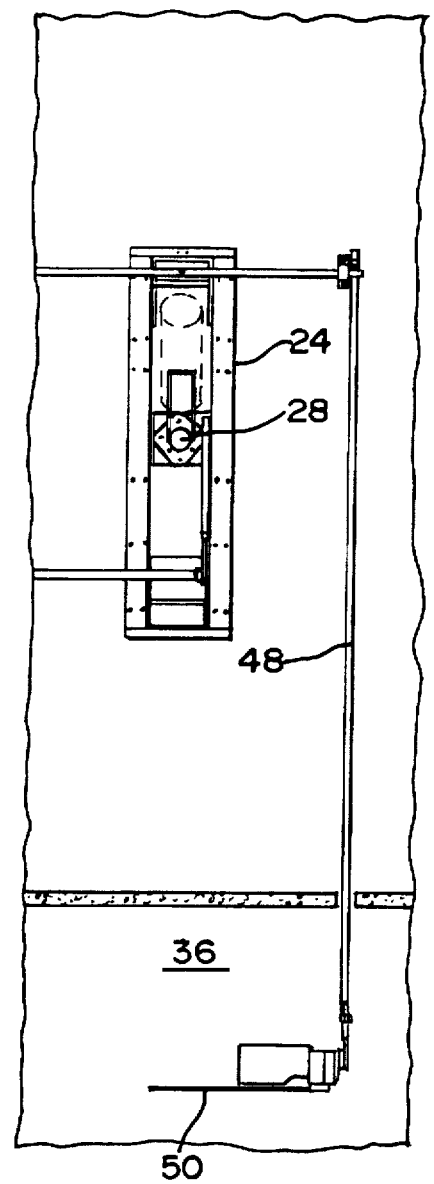
FIG. 6 shows a side view of the assembly of FIG. 4.

Referring now to FIGS. 4, 5 and 6, details of the earthing mechanisms for earthing each of the bus bars are shown. Each earthing mechanism includes an earthing rod 46 pivotally mounted on an extension of the frame 24 and pivotable between an inoperative position shown in FIG. 4, lying parallel to the wall 22, and the operative position shown in FIG. 5 where it lies parallel to the insulator member 40. Pivoting of the rods 46 is effected by a lever 48 which is reciprocated by a hand operated mechanism 50 also located in the cell 36. In certain circumstances, an earthing blade is provided instead of the earthing rod 46.

Figure 14:
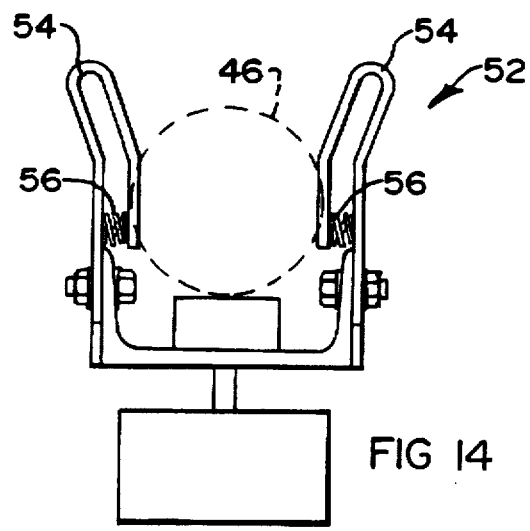
FIG. 14 shows a side view of portion of the earthing assembly used in the isolator assembly.

When each rod 46 is in the position shown in FIG. 5, it seats in a recipient female contact or saddle 52 shown in greater detail in FIG. 14. As shown in FIG. 14, the female contact 52 has a pair of resilient U shaped limbs 54 biassed away from one another by a biassing spring 56, insulated by a spring insulator 71. The female contact 52 is electrically connected to the clamp 32 and thus to the bus bars 31.

Figure 7:
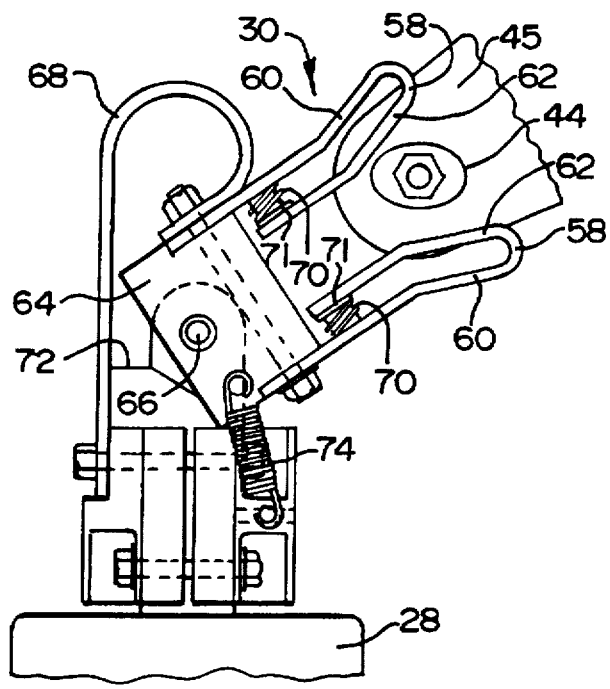
FIG. 7 shows an end view of a contactor assembly used in the isolator assembly of the invention.
Figure 8:
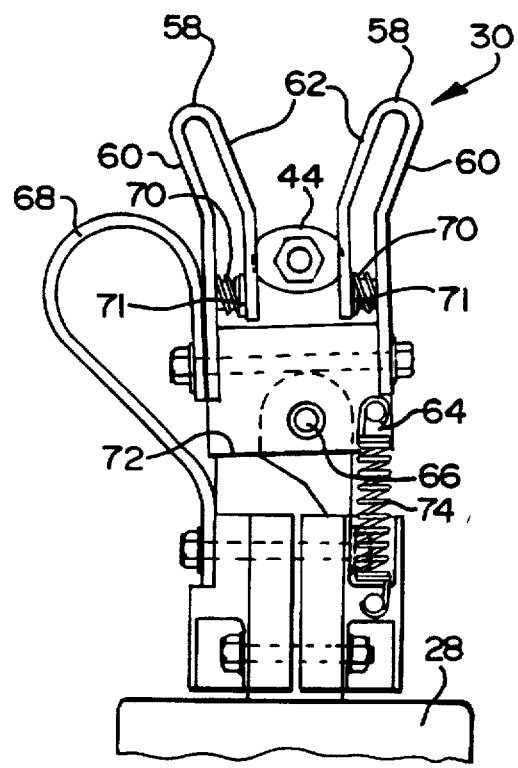
FIG. 8 shows the contactor assembly of FIG. 7 in its fully closed position.
Figure 9:
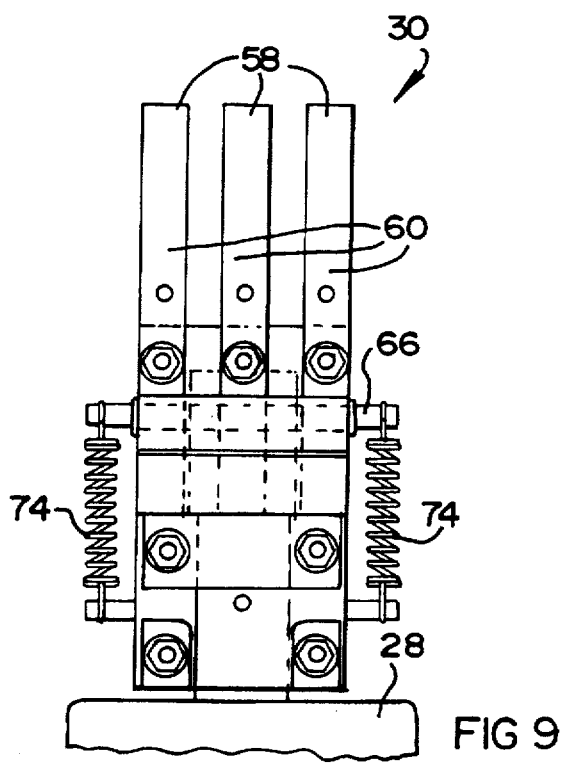
FIG. 9 shows an end view of the contactor assembly of FIG. 8.

Referring now to FIGS. 7, 8 and 9, details of the contactor 30 provided at each end of the bushing 28 are shown. A male contactor 44 which is elliptical as shown is mounted on the plate assembly 45 on the end of the insulator member 40. The contactor 30 includes three sets of jaw members 58 for receiving the male contactor 44. Typically, two to five sets of jaw members 58 are provided depending upon the current handling requirements of the assembly 20. The jaw members 58 are U shaped and each include a pair of limbs 60 and 62. Each limb 60 is fixed on a support member 64 which is pivotally attached on a pivot pin 66 to the end of the bushing 28. A resilient biassing electrical connector 68 and a pair of springs 74 urge the contactor to the position shown in FIG. 7. As the male contactor 44 enters the jaws 58, it cams the jaws 58 from the position shown in FIG. 7 to that shown in FIG. 8 with a knuckle action. The knuckle action allows firm electrical contact to be made without placing undue bending moments on the insulator members 40 or the bushing 28. The Applicant has found that because the high current flowing in each limb 60 and 62 passes in opposite directions, magnetic fields set up by the current also cause the limbs 60 and 62 to spread and thereby urge the limbs 60 and 62 into firm contact with the male contactor 44.

The limbs 62 are further urged into contact with the male contactor 44 by a pair of compression springs 70 which urge the limbs 60 and 62 away from one another. An insulating element 71 (see FIG. 8) is located between an end portion of each spring 70 and the limb 62 to prevent current flowing through each spring 70 and thus prevent it from being heated up thereby possibly annealing it and causing it to lose its biassing characteristics. It will be noted that when the male contactor 44 is in its fully closed position, its major axis extends transversely to the operative faces of the limbs 62. The support member 64, in this position, abuts against a stop formation 72.

Figure 15:
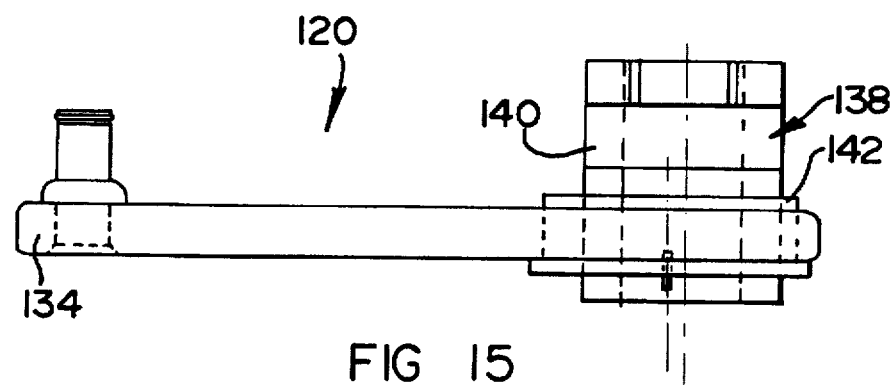
FIG. 15 shows a side view of a drive arm having an adjustable effective length for use in the isolator assembly.

The series of crank arms 130 of FIGS. 1, 2, 4 and 5 include a primary drive arm 132 pivotally mounted on a main drive shaft 128. Fast with the main drive shaft 128, and thus pivoting in sympathy therewith, is an adjustable secondary swivel box drive arm 120 (shown in detail in FIG. 15). As shown in FIG. 1, the adjustable drive arm 120 is attached at its end 134 to a drive rod 136 which is drivingly connected to the hub 26 thereby to permit selective displacement of the bushing 28 between its connecting and disconnecting positions. The adjustable drive arm 120 is attached to the main drive shaft 128 by means of an expansion type "Trantorque" coupling 138 (see FIG. 15). Adjustment means for adjusting the effective length of the drive arm 120 is defined by an eccentric split cam bush 142 and an expansion clam. 140. In order to adjust the effective length of the drive arm 12, the eccentric split cam bush 142 whereafter the expansion clamp 140 is tightened to an appropriate torque to check any further displacement of the split cam bush 142. Upon installation of the isolator assembly 20, the effective length of the drive arm 120 is adjusted to maximise electrical contact between the male contactor 44 and the female contactor 30. The rod 38 of FIG. 1 also has opposed left and right hand threads held by lock nuts 38.1 and 38.2 to permit adjustment of the effective length of the rod 38.

In the embodiment depicted in the drawings, the bus bars 31 located in cells 23, 25 are vertically spaced from each other. However, in certain embodiments the plate assemblies 45 and the clamps 32 are configured to permit selective connecting and isolating of bus bars 31 which lie in the same horizontal plane as illustrated by dotted line 47 in FIG. 1.

Figures 10, 11:
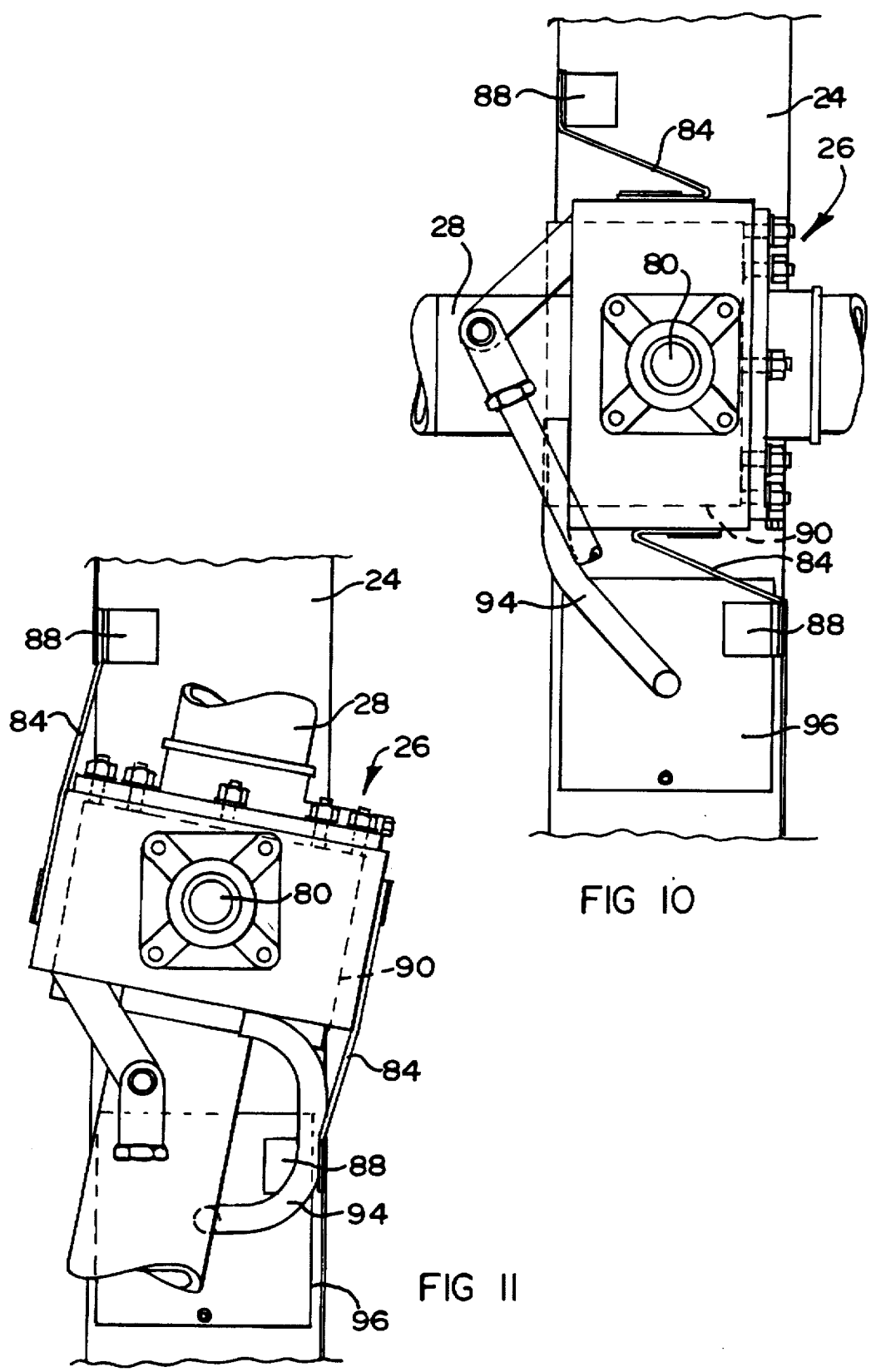
FIG. 10 shows a sectional end view, to a larger scale, of portion of the isolator assembly of FIG. 1 in its connecting position.
FIG. 11 shows a view similar to FIG. 10 with the isolator assembly in its disconnecting position.
Figure 12:
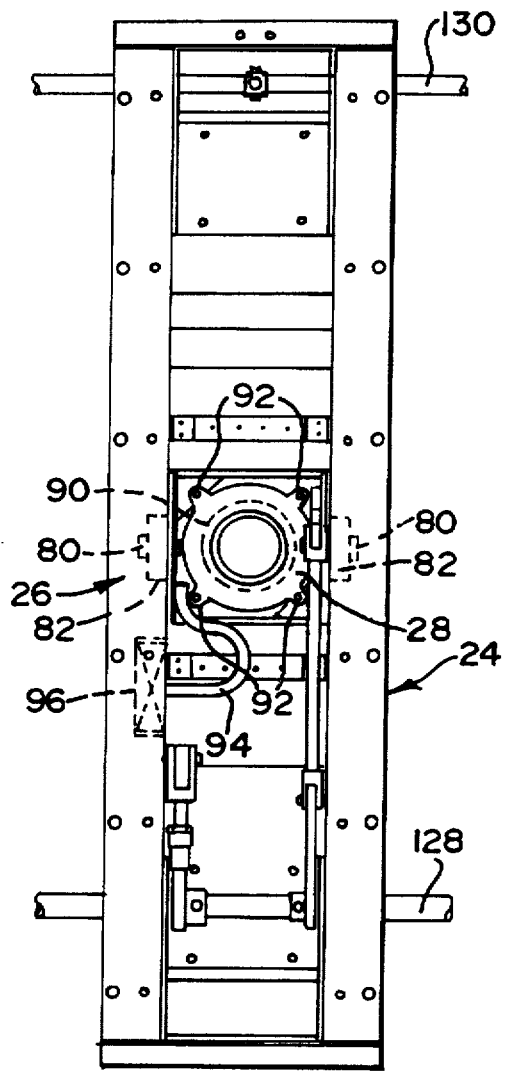
FIG. 12 shows a side view of portion of the isolator assembly of FIG. 10.

Referring now to FIGS. 10, 11 and 12, the hub 26 is shown in greater detail.

The hub 26 has stub axles 80 protruding outwardly on either side and which are received in roller or sleeve bearings 82 (only shown in FIG. 12).

Flash barriers 84, in the form of woven glass mats which are flexible, extend from either side of the hub 26 to plates 88 fixed to the frame 24. The flash barriers 84 close windows defined between the hub 26 and the upper and lower sections of the frame 24 and which would otherwise provide openings between the cells on either side of the wall 22.

In certain circumstances, the hub 26 has a centrally mounted ring current transformer 90 therein. The current transformer 90 is held in position by an aluminium shroud 92 (only shown in FIG. 12). The current transformer 90 is used to generate an output signal proportional to the current flowing in the bushing 28 and is connected to control equipment at the sub station. Wiring (not shown) from the current transformer 90 is led through a flexible conduit 94, and through suitable glands (not shown) in the frame 24 to a terminal box 96 also provided within the frame 24. Wiring from the terminal box 96 extends through the frame 24 and via a conduit (not shown) to the control equipment which may be located in the cell 36.

Figure 16:
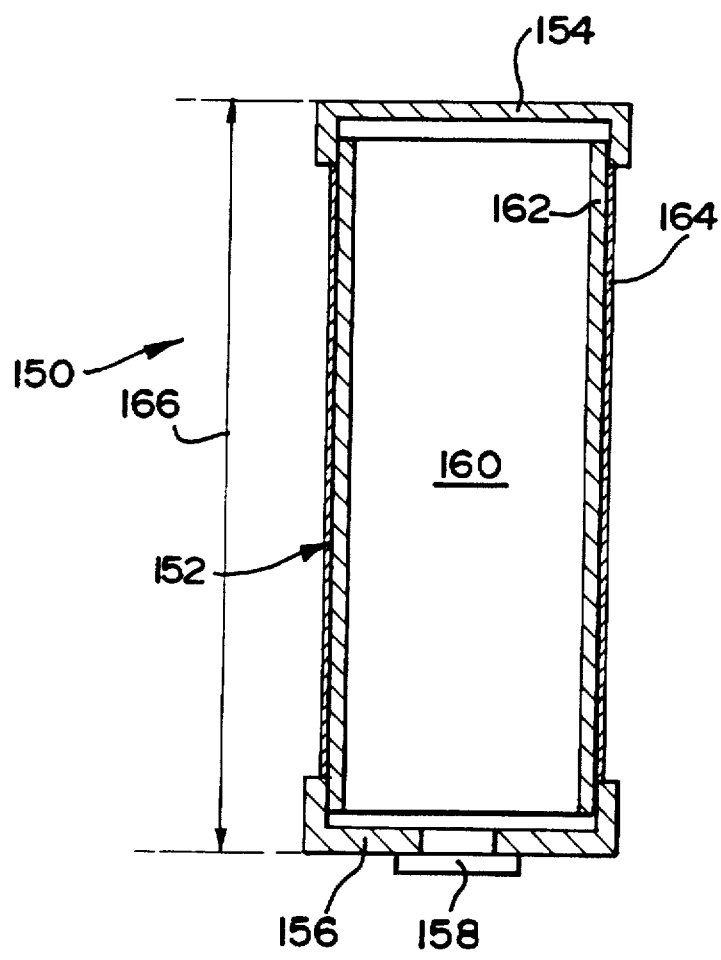
FIG. 16 shows a schematic diagram of a housing for housing a voltage transformer or surge arrestor used in the isolator assembly.

Referring to FIG. 16, reference numeral 150 generally indicates a housing for housing a voltage transformer or surge arrestor. The housing 150 has a cylindrical body portion in the form of a gas insulated tube 152 terminated in two aluminium end caps 154, 156. The end cap 156 has an over-pressure relief valve 158 which provides a relief outlet to inert insulating gas 160, held captive within the tube 152. Typically the inert insulating gas is $SF_6$. The tube 152 is composed of a composite glass-fibre inner sleeve 162 and an external hydrophobic covering 164. The length 166 of the sleeve is selected to suit the voltage at which the isolator operates.

In certain circumstances the housing 150 replaces the insulators 40 by fitting the housing 150, which incorporates an inert gas insulated voltage transformer or surge arrestor, on either side of the isolator assembly 20. The housing 150 is configured to support both the male contactors 44 and the bus bars 31 by means of the plate assemblies 45.

Figure 13:
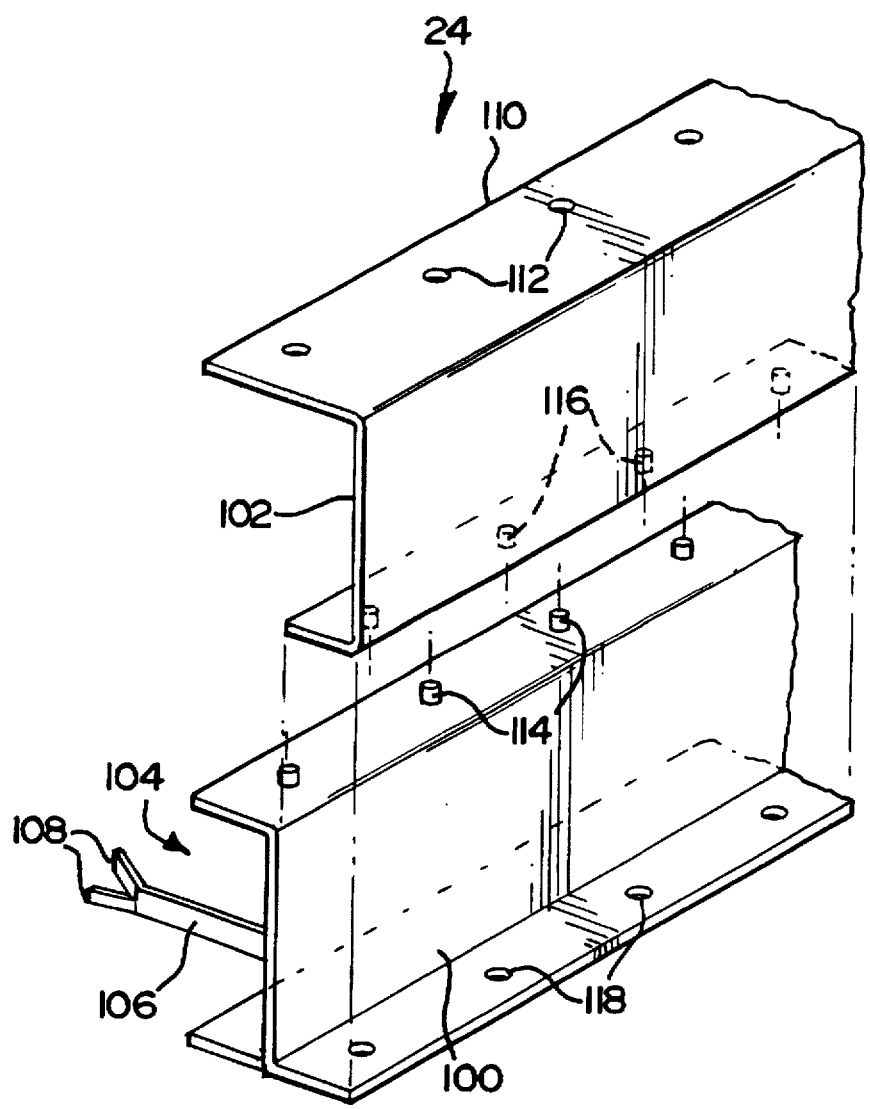
FIG. 13 shows a schematic three dimensional view of portion of a frame used in the isolator assembly of the invention.

Referring now to FIG. 13, an exploded schematic three dimensional view of portion of the frame 24 is shown. The frame 24 is of boxlike construction and is of uniform cross section throughout. The frame comprises an outer frame 100 and an inner frame 102. The outer frame 100 has a channel 104 for receiving the wall 22. A plurality of anchoring members 106, only one of which is shown, are provided along the length of the outer frame 100. Each anchoring member has splayed ends 108 to assist in anchoring the frame in the wall 22.

In use, the outer frame 100 is supplied to a builder when a sub station is being built and is built into the wall 22 or a floor slab. After the building operations have been completed, the inner frame 102 together with the hub 26 and bushing 28 are fitted within the outer frame 100. The inner frame 102 is also of channel shape and has a flange 110 with apertures 112 which are matingly received on studs 114 on the outer frame 100. Further studs 116 on the inner frame 102 are received in mating apertures 118 in the outer frame 100. Dome shaped nuts (not shown) are then fitted on the studs 114 and 116 to bolt the inner and outer frames 102, 100 together. The dome shaped nuts protrude as little as possible from the wall 22 so as not to disturb the homogenous electrical field which exists in the vicinity of the isolator assembly 20 thereby to minimise the danger of flash over.

The contactor 30 shown in FIGS. 7, 8 and 9 is intended for isolator assemblies where currents in excess of 800 amps are carried. The female contacts shown in FIGS. 7 to 9 are formed from silver plated hard drawn copper. If the current is limited to below 800 amps, the bushing 28 can be fitted with a male blade type silver plated copper contactor (not shown) rather than the contactor shown in FIGS. 7 to 9. The male contactor is then matingly received in a female contactor provided on the plate 45.

The hub 26 is preferably made of a non magnetic stainless steel or aluminium. The insulator members 40 are typically made of porcelain. Depending on the application of the isolator assembly (20), the insulator members 40 may be replaced for example either with a voltage transformer or a surge arrestor housed in the gas filled housing 150.

The invention illustrated provides an isolator assembly 20 which can readily be mounted in a wall 22 or floor slab separating cells 23, 25 of a sub station and allows maintenance of equipment within each cell to be carried out safely without the need for providing gas insulation of switchgear. The current transformer 90 fitted within the hub 26 allows monitoring of current flowing in the bushing 28 in a simple yet effective manner. Further, the length of the drive arm 120 may be adjusted during installation of the isolator assembly 20 to maximise electrical contact between the male and female contactors. The housing 150 also allows the integration of a voltage transformer or surge arrestor in a simple yet effective manner. Accordingly, building dimensions may be reduced in order to reduce substation construction costs.

I claim:

1. An isolator assembly for selectively isolating or connecting first and second bus bars located on opposed sides of a wall, the assembly including mounting means for mounting the assembly in the wall; and a through-wall conductor pivotally supported between its ends by the mounting means so that it extends through the wall in use, the conductor being displaceable between a connecting position in which the conductor connects the first and the second bus bars and a disconnecting position in which the first and the second bus bars are isolated front each other.

2. An assembly as claimed in claim 1, which includes a contactor mounted on each opposed end of the through-wall conductor, the contactor including at least two jaw members between which a complemental contactor is receivable, the jaw members being mounted on a support member which is pivotally mounted on the through-wall conductor, the contactor including biassing means to bias the jaw members in an extreme receiving position in which the complemental contactor is received between the jaw members, and an extreme locking position in which the complemental contactor is fully home between the jaw members.

3. An assembly as claimed in claim 2, which includes at least one insulator member for mounting on and extending at an angle from the wall, the complemental contactor being mounted at an end of the insulator member which is remote from the wall.

4. An assembly as claimed in claim 3, which includes a plate assembly mounted on the insulator member at the end remote from the wall, the complemental contactor being mounted on the plate assembly which is connectable to one of the first and second bus bars.

5. An assembly as claimed in claim 4, in which the insulator member defines an inert gas filled housing for housing either a voltage transformer or surge arrestor.

6. An assembly as claimed in claim 5, in which the housing is in the form of a composite fibre gas insulated tube with a hydrophobic outer layer.

7. An assembly as claimed in claim 2, in which the complemental contactor is ellipsoidal in shape so that upon displacement of the through-wall conductor, the complemental contactor pivots the jaw members with a camming action between the extreme receiving position an the extreme locking position.

8. An assembly as claimed in claim 2, in which the jaw members are each in the form of a U shaped member including spaced limbs, one limb of the U shaped member being fixed to the support member and another limb of the U shaped member providing a camming surface for co-operating with the complemental contactor.

9. An assembly as claimed in claim 8, in which the U shaped member is resilient and the limbs are biased outwardly away from one another by a biasing spring located intermediate the limbs, the biasing spring being insulated from at least one limb.

10. An assembly as claimed in claim 1, which includes an earthing mechanism for earthing at least one of the first and the second bus bars while power is removed from the bus bars, the earthing mechanism including an earthed rod displaceable between an inoperative position in which it is disconnected from the bus bars, and an operative position in which the bus bars is connected to earth.

11. An isolator assembly for selectively isolating or connecting first and second bus bars located on opposed sides of a wall, the assembly including mounting means for mounting the assembly in the wall, the mounting means including a frame locatable in the wall, and a hub pivotally mounted within the frame; and a through-wall conductor in the form of a bushing fixed to the hub, the bushing being pivotable between a connecting position in which the bushing connects the first and the second bus bars, and a disconnecting position in which the first and the second bus bars are isolated from one another.

12. An assembly as claimed in claim 11, in which the bushing defines first and second bushing arms extending in opposite directions from the hub, each bushing arm having at its end remote from its attachment to the hub a contactor capable of making electrical contact with the respective first and second bus bars.

13. An assembly as claimed in claim 11, in which the bushing is pivotable through an arc spanning an acute angle from its connecting position with the bushing extending substantially at right angles relative to the wall, to its disconnecting position with the bushing extending close to a face of the wall, the assembly including a drive mechanism for pivoting the bushing between its connecting and disconnecting positions, the drive mechanism including a drive arm including adjustment means for adjusting an effective length of the drive arm thereby to permit variation of a length of the arc through which the bushing can be pivoted.

14. An assembly as claimed in claim 11, in which the hub includes a step down current transformer mounted therein, the transformer being capable of developing an output signal proportional to current-flowing in the bushing.

15. An assembly as claimed in claim 11, in which the frame includes an outer frame, and an inner frame removably mountable within the outer frame, the outer frame having a plurality of outwardly projecting anchoring formations to assist in anchoring the frame within the wall.

16. An assembly as claimed in claim 11, which includes two flexible flash barriers which cover respective openings defined between the hub and opposite sides of the frame while the bushing is in its connecting position.

17. An assembly as claimed in claim 16, in which each flash barrier is in the form of a woven glass mat.

18. A substation installation which includes at least two cells separated by a wall and in which first and second bus bars are located on opposed sides of the wall, the installation including at least one isolator assembly which includes mounting means for mounting the assembly in the wall; and a through-wall conductor pivotally supported between its ends by the mounting means so that it extends through the wall in use, the conductor being displaceable between a connecting position in which the conductor connects the first and the second bus bars and a disconnecting position in which the first and the second bus bars are isolated from each other.

* * * * *